No. 894,576. PATENTED JULY 28, 1908.
M. M. BERG.
ANIMAL TRAP.
APPLICATION FILED NOV. 16, 1907.
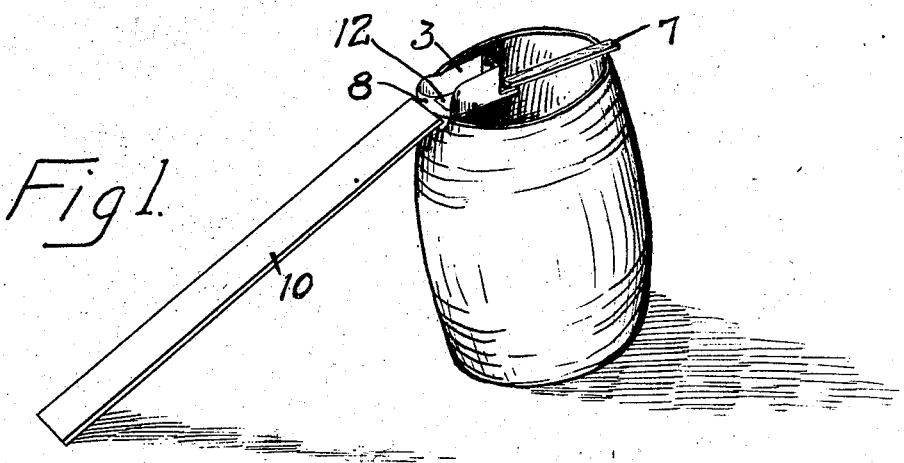
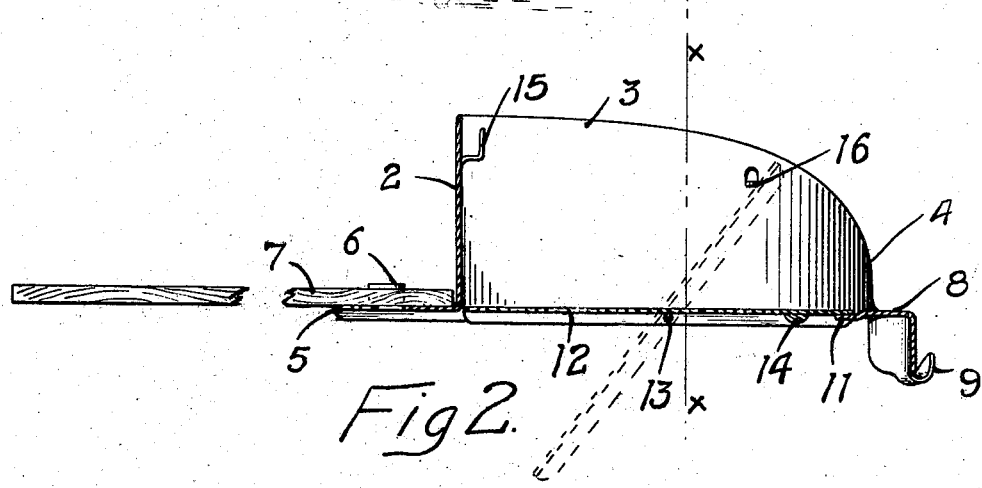
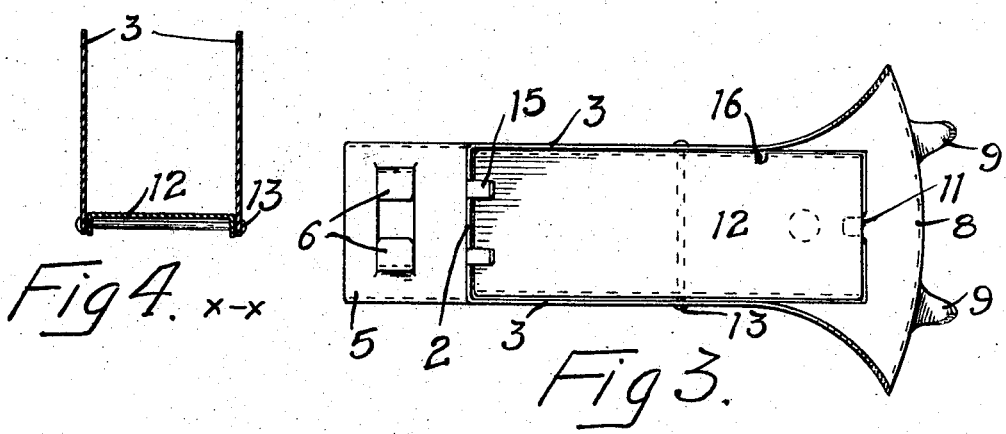
WITNESSES
INVENTOR
MONS M. BERG
BY Paul & Paul
HIS ATTORNEYS

UNITED STATES PATENT OFFICE.

MONS M. BERG, OF BEARDSLEY, MINNESOTA.

ANIMAL-TRAP.

No. 894,576.  Specification of Letters Patent.  Patented July 28, 1908.

Application filed November 16, 1907. Serial No. 402,445.

*To all whom it may concern:*

Be it known that I, MONS M. BERG, of Beardsley, Bigstone county, Minnesota, have invented certain new and useful Improvements in Animal-Traps, of which the following is a specification.

The object of my invention is to provide a simple inexpensive device capable of use with a barrel, pail or other receptacle having vertical side walls and having means whereby when the animal enters the trap it will be precipitated into the receptacle beneath.

The invention consists generally in various constructions and combinations, all as hereinafter described and particularly pointed out in the claims.

In the accompanying drawings, forming part of this specification, Figure 1 is a perspective view of a trap embodying my invention. Fig. 2 is a longitudinal sectional view of the same. Fig. 3 is a top view. Fig. 4 is a transverse sectional view on the line $x$—$x$ of Fig. 2.

In the drawing, 2 represents the end wall of the trap and 3 the side walls having an opening 4 at one end to permit the entrance of the mouse into the trap. The wall 2 has a horizontal projection 5 at its lower end provided with clips 6 between which and the projection a bar 7 is inserted to aid in supporting the device upon the top of a barrel, indicated in Fig. 1. When a pail is used the bar may be shorter than shown.

The forward end of the device is provided with a shelf 8 having downwardly and outwardly turned clips 9 which are adapted to dig into the surface of a board 10 and hold it in an inclined position against the shelf as indicated in Fig. 1. When in this position the upper end of the board will be nearly on a level with the bottom of the trap so that the animal can easily enter. The shelf is provided on its inner edge with a horizontal lip 11 and the bottom plate 12 of the trap is centrally hinged at 13 and adapted to swing freely on its pivot and normally rest on the lip 11 being held in this position by a weight 14. When the mouse enters the trap and reaches up for the bait on the hook 15 the bottom plate will tilt to the position indicated by dotted lines and the mouse will be precipitated into the barrel or other receptacle beneath. A stop 16 on the wall of the trap prevents the plate from swinging beyond the desired angle. As soon as the mouse has been discharged from the trap the plate will automatically swing back to its horizontal position and be ready for the next mouse.

When the trap is placed on a barrel or pail the shelf 8 fits around the top of the receptacle and aids in holding the device thereon.

The trap while adapted for catching small animals of various kinds is designed particularly as a trap for rats and mice.

I claim as my invention:

1. A trap comprising side walls and a pivoted bottom plate in combination, with an open topped receptacle, a bar connected to the inner end of said trap and adapted to extend across the receptacle and support the trap thereon, and said trap having a support at its opposite end and an inclined way extending from the ground to said support, substantially as described.

2. A trap comprising side walls and a bottom plate hinged at a point intermediate to its ends between said walls, an end plate connecting said walls at one end of the trap, the opposite end being open, said end plate having a horizontally projecting flange and clips thereon, a supporting bar fitting between said flange and clips, the opposite end of said trap having a stop to prevent downward movement of the outer end of said plate, and a shelf to rest upon an open topped receptacle, and said shelf having lugs formed thereon adapted to engage the under side of a plank.

3. The combination, with an open topped receptacle, of a trap comprising side walls and an end wall, a bottom plate hinged at a point intermediate to its ends and normally held in a horizontal position by gravity, a stop supporting the outer end of said plate, a bar connected to the inner end of said trap and adapted to extend across the receptacle and support the trap thereon, a shelf provided at the outer end of said trap and having a depending portion arranged to support the end of a board placed at an incline from the ground to the top of said receptacle, substantially as described.

In witness whereof, I have hereunto set my hand this 4th day of November 1907.

MONS M. BERG.

Witnesses:
G. J. MACK,
J. C. EKERN.